United States Patent
Studzinski et al.

(10) Patent No.: US 8,764,854 B1
(45) Date of Patent: Jul. 1, 2014

(54) REFERENCE FUEL COMPOSITION

(75) Inventors: William M. Studzinski, Shelby Township, MI (US); Jill M. Cummings, Byron, MI (US)

(73) Assignee: GM Global Technology Operations LLC, Detroit, MI (US)

(*) Notice: Subject to any disclaimer, the term of this patent is extended or adjusted under 35 U.S.C. 154(b) by 246 days.

(21) Appl. No.: 13/424,993

(22) Filed: Mar. 20, 2012

(51) Int. Cl.
| | |
|---|---|
| C10G 29/20 | (2006.01) |
| C01B 3/24 | (2006.01) |
| C10G 1/00 | (2006.01) |
| C10G 1/08 | (2006.01) |
| C10G 3/00 | (2006.01) |
| C01B 3/38 | (2006.01) |
| C08K 5/00 | (2006.01) |

(52) U.S. Cl.
CPC C10G 29/20 (2013.01); C10G 1/00 (2013.01); C01B 3/24 (2013.01); C10G 1/004 (2013.01); C10G 1/002 (2013.01); C10G 1/086 (2013.01); C10G 3/44 (2013.01); C10G 2300/00 (2013.01); C01B 2203/1041 (2013.01); C01B 2203/1082 (2013.01); C01B 2203/127 (2013.01); C01B 3/38 (2013.01); C01B 3/386 (2013.01); C08K 5/005 (2013.01)
USPC ............... 44/251; 423/651; 423/650; 423/652

(58) Field of Classification Search
CPC ............................................... C10G 29/20
USPC ............... 44/300, 393, 251; 585/14; 423/651, 423/650, 652
See application file for complete search history.

(56) References Cited

U.S. PATENT DOCUMENTS

| | | | |
|---|---|---|---|
| 5,503,644 | A | 4/1996 | Graiff et al. |
| 5,928,393 | A | 7/1999 | Ishida et al. |
| 6,370,946 | B1 | 4/2002 | Lacey et al. |
| 6,746,495 | B2 | 6/2004 | Avery et al. |
| 7,422,161 | B2 | 9/2008 | Hou et al. |
| 2004/0007504 | A1* | 1/2004 | Uzio et al. ............... 208/216 R |
| 2006/0196111 | A1 | 9/2006 | Colucci |

OTHER PUBLICATIONS

Electronic Code of Federal Regulations, Title 40: Protection of Environment, Section 80.164; Data as of Feb. 2, 2013; 4 Pages.
Chevron Phillips Chemical Company Issued Sales Specification for 65th Percentile Fuel—HC Only; Revised Oct. 12, 2010; 2 Pages.
Von Bacho et al., "Development of a Robust Injector Design for Superior Deposit Resistance", SAE Technical Paper Series, 2005.
Von Bacho et al., "Engine Test for Accelerated Fuel Deposit Formation on Injectors Used in Gasoline Direct Injection Engines", SAE International, 2009.

* cited by examiner

Primary Examiner — Walter D Griffin
Assistant Examiner — Chantel Graham
(74) Attorney, Agent, or Firm — Cantor Colburn LLP (57) ABSTRACT

In some embodiments, a deposit-forming reference fuel composition comprises a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition. The deposit-forming reference fuel composition also comprises a reactive diolefin dopant; and a reaction initiating peroxide. The reaction initiating peroxide has an active oxygen content greater than or equal to 2 weight % based on total oxygen content of the reaction initiating peroxide and a half-life temperature of 80° C. to 200° C. The deposit-forming reference fuel composition is free from a detergent additive and has a concentration ratio of greater than 1:1 for the reactive diolefin dopant to the reaction initiating peroxide.

22 Claims, 4 Drawing Sheets

Reference Fuel Formulation for Fuel Deposit Testing Evaluations in Automotive Engines

FIG. 3B

REFERENCE FUEL COMPOSITION

FIELD OF THE INVENTION

Disclosed herein are fuel compositions and, more particularly, a reference fuel composition that can produce a high amount of intake valve (IV) and port fuel injector (PFI) oxidized carbon deposits in a repeatable way.

BACKGROUND

During operation of internal combustion engines, the hot surfaces of the components can be exposed to many gases and liquids including the fuel composition, lubricating fluids, combustion byproducts, and so forth. If undesirable deposits or sludge forms on such components as a result of this operation, the engine performance can be negatively affected. For example, deposits on fuel injectors can undesirably obstruct or plug metering holes of the injector tip. Likewise, deposits on intake valves can reduce optimal engine performance.

Accordingly, as the fuel composition can affect the level of such deposit formation or fouling, much effort continues to be put forth in the industry in an attempt to develop fuel composition detergent additives capable of controlling, reducing, or eliminating such fouling formation.

However, in order to test the effectiveness of such detergent additives for fuel compositions, repeatable deposit build-up reference fuel compositions are needed. A reference fuel composition is a fuel composition that repeatedly and consistently can create deposits in an engine during testing. This is sometimes referred to as "dirty-up" fuel in the industry. The effectiveness of various detergent additives added to the reference fuel composition to reduce deposits can then be evaluated, compared, and optimized. Moreover, having a consistent carbon deposit producing "dirty-up" reference fuel composition also can advantageously enable the evaluation of new engine hardware components and calibration systems. Also, in recent years, several automobile manufacturers jointly created a voluntary deposit control standard for gasoline with a goal to define a new class of commercial gasoline with enhanced detergency termed TOP TIER Detergent Gasoline. Thus, the TOP TIER Detergent Gasoline program also would benefit from the development of such consistent reference fuel compositions.

Accordingly, it is desirable to provide a reference fuel composition useful for, for example, evaluating gasoline detergent additives and/or engine hardware.

SUMMARY OF THE INVENTION

In one exemplary embodiment, a deposit-forming reference fuel composition comprises a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition. The deposit-forming reference fuel composition also comprises a reactive diolefin dopant, and a reaction initiating peroxide. The reaction initiating peroxide has an active oxygen content greater than or equal to 2 weight % based on total oxygen content of the reaction initiating peroxide and a half-life temperature of 80° C. to 200° C. The deposit-forming reference fuel composition is free from a detergent additive and has a concentration ratio of greater than 1:1 for the reactive diolefin dopant to the reaction initiating peroxide.

In another embodiment, a method of making a deposit-forming reference fuel composition comprises preparing a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition. The method further comprises adding to the base fuel composition: a) a reactive diolefin dopant, and b) a reaction initiating peroxide having an active oxygen content greater than or equal to 2 weight % based on total oxygen content of the reaction initiating, and having a half-life temperature of 80° C. to 200° C. The reactive diolefin dopant and the reaction initiating peroxide are added in a concentration ratio of greater than 1:1.

In a further embodiment, a fuel composition comprises a high sulfur base fuel composition in an amount greater than 50 weight % based on total weight % of the fuel composition, wherein the high sulfur base fuel composition comprises greater than or equal to 200 ppm sulfur based upon total sulfur content of the base fuel composition. The fuel composition also comprises a reactive diolefin dopant comprising a cyclic diolefin; and a reaction initiating alkyl peroxide with an active oxygen content greater than or equal to 2 weight % based on total oxygen content of the reaction initiating peroxide and a half-life temperature of greater than or equal to 90° C. The fuel composition has a concentration ratio of greater than 1:1 for the reactive diolefin dopant to the reaction initiating peroxide.

The above features and other features are readily apparent from the following detailed description when taken in conjunction with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its applications or uses.

Port fuel ignition (PFI) injectors and spark ignition direct fuel (SIDI) injectors are designed to run at different injector pressures and temperatures, which make it difficult for a fuel composition to respond similarly during deposit testing. However, it has been determined how to develop a formulation that can consistently create deposits on, for example, PFI injectors and SIDI injectors. According to embodiments, this fuel formulation can produce high and consistent levels of both intake valve (IV) deposits and injector deposits (ID) for both PFI and SIDI engines.

These developments satisfy a need in the industry in that, for example, some petroleum refinery fuel containing high amounts of fluid catalytic cracked (FCC) naphtha can be used to produce injector plugging and intake valve deposits as the FCC streams are oxidatively unstable and can lead to high engine deposits. However, FCC composition variation from refinery to refinery does not allow a repeatable "dirty-up" deposit reference fuel. Alternative deposit producing compositions are needed.

Thus, in accordance with an exemplary embodiment, a deposit-forming reference fuel composition is disclosed, which advantageously can use a combination of base gasoline or fuel, reactive diolefin dopant(s), and reaction initiating peroxide(s). As a result of extensive testing, the inventors have determined a synergistic effect of a combination of compositional constituents, such as diolefin to peroxide ratios. These features and testing are further described below.

According to embodiments, the deposit-forming reference fuel composition can result in a repeatable level of carbon deposits in controlled automotive engine deposit testing. Repeatable test results, as used herein, refer to the percent variation of the individual engine test results relative to their average for two or more tests of the same reference fuel composition. For example, the individual PFI valve deposit results for each test should be within 10% of the average result for the total tests. The SIDI injector deposit lean fuel trim results of each test should be within 25% of the average result for the total tests.

For PFI valve deposits, as measured by individual air/fuel ratios, the result for each test should be plus or minus 1.0 of the average air/fuel ratio result for the total tests. Additionally, embodiments of the deposit-forming reference fuel compositions can result in "high" injector plugging, e.g., measured as greater than (>) 16.0:1.0 specifically greater than 17.0:1.0, air/fuel ratio for an individual engine cylinder. It is noted that the air/fuel ratio refers to the mass ratio of air to fuel composition present in an internal combustion engine, and is used to measure the efficient burning of a fuel composition in an internal combustion engine. For example, the stoichiometric air/fuel ratio is known as the ratio at which all of the available oxygen is used to burn the fuel composition. Thus, the deposit-forming reference fuel compositions also can result in greater than 10% ECM (engine control module) lean fuel trim shift, specifically greater than 15% lean fuel trim shift, according to embodiments. As a non-limiting example, the above ratios and percentages thus can be calculated based on a stoichiometric air/fuel ratio of 14.7 for regular unleaded gasoline having an octane level of 87. Fuel trim shift refers to the control (e.g., shifting or adjusting) of the fuel composition delivery by the ECM to adjust the air/fuel ratio in attempting to achieve the stoichiometric ratio (e.g., complete burn of fuel composition). Accordingly, the ratios for the deposit-forming reference fuel compositions according to embodiments are higher than the referenced 14.7 ratio in view of the adjustments in air/fuel ratio by the ECM to take into consideration the deposits. "Lean" generally refers to the minimization of the amount of fuel composition need to be burned in attempting to achieve the stoichiometric ratio.

"High" intake valve deposits as used herein refer to deposits of greater than or equal to 400 milligram (mg) per cylinder, specifically greater than or equal to 600 mg, as supported by the below-referenced testing. Testing of the compositions disclosed herein has demonstrated the desired repeatable effect of injector plugging and desired amounts of high intake valve deposits.

In accordance with an embodiment, a deposit forming reference fuel composition is disclosed, which is free from a detergent additive, and comprises a base fuel composition comprising the constituents set forth below in Table 1. A "detergent additive" is generally understood in the industry as an additive capable of controlling, reducing, or eliminating fouling formation when added to a fuel composition, such as regular unleaded gasoline having an octane level of 87.

TABLE 1

| Base Fuel Composition | Unit | Minimum |
| --- | --- | --- |
| Sulfur | Ppm | ≥200 |
| Aromatics | Volume % | ≥20 |
| Olefins | Volume % | ≥10 |
| 90% Distillation Temperature (T90) | ° C. | ≥160 |

As an example, the base fuel composition, which can be a hydrocarbon base fuel, comprising carbon, hydrogen, oxygen, nitrogen, sulfur, can represent a major amount of the reference fuel composition, i.e., greater than 50 weight percent (%) of the total reference fuel composition.

As shown in Table 1, according to an embodiment, the base fuel composition comprises a high sulfur content of greater than or equal to (≥) 200 parts per million by weight (ppm) sulfur. "High sulfur base fuel" (HSF) composition herein refers to a base fuel composition comprising greater than or equal to 200 ppm sulfur based on total sulfur content of the base fuel composition. The high sulfur base fuel composition also can comprise greater than or equal to 340 ppm sulfur, which is approximately 10 times higher than the sulfur content found in most United States (U.S.) regular unleaded gasolines (RUL). For example, a typical regular unleaded gasoline on the market comprises 30 ppm to 80 ppm of sulfur in its composition.

As further shown in Table 1, according to an embodiment, the high sulfur base fuel composition can comprise greater than or equal to 20 volume percent (%) aromatics, which are known as the high boiling point chemical species in gasoline. The high sulfur base fuel composition could comprise greater than or equal to 25 volume % aromatics, specifically greater than or equal to 30 volume % aromatics. Although these species provide good energy and therefore high mileage per gallon for a vehicle, they can potentially lead to soot and engine deposits. The high sulfur base fuel composition can comprise a higher level of aromatics relative to the aromatics content typically found in regular unleaded gasoline on the market. Suitable aromatics include, but are not limited to, benzene, toluene, xylene, and naphthalene, as well as combinations comprising at least one of the foregoing, among others typically found in, e.g., regular unleaded gasoline having an octane level of 87 and which has a gasoline boiling point maximum of 437° F. (225° C.) in the U.S. As noted above, the high sulfur base fuel composition set forth in Table 1 also can comprise greater than or equal to 10 volume % olefins, and specifically greater than or equal to 13 volume % olefins. The high sulfur base fuel composition can comprise a higher level of olefins relative to the olefin content typically found in regular unleaded gasoline (e.g., octane level of 87) on the market. The olefins include, for example, $C_4$ to $C_{12}$ olefins where C refers to the number of carbons in the molecule.

The 90% distillation temperature (T90) set forth in Table 1 reflects the volatility of the heaviest species present in the deposit-forming reference fuel composition, generally a result of the aromatic species present. The high sulfur base fuel composition of Table 1 can comprise a T90 of greater than or equal to 160° C., specifically greater than or equal to 170° C. The base fuel composition can comprise a higher level of T90 compared to regular unleaded gasoline (87 octane) typically found in the market.

It is further noted that the high sulfur base fuel composition, also can comprise other constituents including, but not limited to, other hydrocarbons, paraffins, such as $C_4$-$C_{12}$ paraffins, aromatics, olefins, oxygenates, among others, as well as combinations comprising at least one of the foregoing. As an example, the high sulfur base fuel composition could include one or more the following: greater than or equal to 60 volume % paraffins, greater than or equal to 20 volume % aromatics, greater than or equal to 10 volume % olefins and greater than or equal to 10 volume % oxygenates (e.g., ethanol). As a further example, the high sulfur base fuel composition could comprise: 30 volume % paraffins to 80 volume % paraffins; 10 volume % aromatics to 40 volume % aromatics; up to 30 volume % olefins; and up to 10 volume % oxygenates (e.g., ethanol).

A deposit-forming reference fuel composition can be made by, for example, first preparing a high sulfur base fuel composition of desired constituents by using blending techniques typically employed in mixing gasoline constituents. The high sulfur base fuel composition represents a major amount (i.e., greater than 50 weight % of the total reference fuel composition). For example, the base fuel composition can comprise greater than 50 weight % of the total reference fuel composition, specifically greater than or equal to 60 weight % of the total reference fuel composition, and more specifically greater than or equal to 70 weight % of the total reference fuel composition. It is noted that there is no one specific upper limit of the amount of base fuel composition as the amount will vary depending upon the constituents of the reference fuel composition. As a non-limiting example, the base fuel composition can comprise up to 80 weight % of the total reference fuel composition. The high sulfur base fuel composition can be blended together with desired constituents referenced below using blending techniques typically employed in mixing gasoline constituents.

Specifically, to the high sulfur base fuel composition of desired composition, a reaction initiating peroxide and a reactive diolefin dopant can be added, as described below.

As the tip temperature of an automotive fuel injector can be as high as about 90° C. and even up to about 130° C., it has been determined through testing that a peroxide with a half-life temperature, e.g., between that range (e.g., 90° C. to 130° C.) could be employed. More particularly, testing has demonstrated that high oxygen content did not consistently produce desired results, but peroxide chemistries with lower half-life temperatures were particularly effective. Other examples of suitable peroxides include those with a half-life temperature between 80° C. and 200° C., more specifically between 90° C. and 150° C. and, even more specifically between 100° and 130° C.

It has further been determined that the oxygen content of the peroxide can be as high as possible while still being fully soluble in the base fuel composition. In particular, the oxygen content can be greater than or equal to 2 weight %, based upon the total oxygen content of the peroxide, as noted in Table 2. More specifically, the reference fuel composition can comprise a reaction initiating peroxide having an oxygen content greater than or equal to 5 weight %, specifically greater than or equal to 6 weight %, and more specifically greater than or equal to 7 weight %, all based upon the total oxygen content.

The reaction initiating peroxide can be selected from the group consisting of, for example, di-t-butyl peroxide, dicumyl peroxide, 2,5-di(t-butylperoxyl)-3,3,5-trimethylcyclohexane, t-butyl peroxy-2-ethylhexanoate, 1,1-di(t-butylperoxy)-3,3,5-trimethylcyclohexane, 2,5-di(2-ethylhexanoylperoxy)-2,5-dimethylhexane, t-butyl peroxy-2-ethyhexanoate and a combination thereof, among others.

Also, the reactive diolefin concentration (ratio of diolefin to peroxide) can be greater than 1:1, specifically greater than or equal to 2:1 and, more specifically greater than or equal to 5:1.

Testing has demonstrated that a deposit-forming reference fuel composition comprising, in part, a combination of the afore-described high sulfur base fuel (HSF) composition, an alkyl peroxide (P) and a reactive cyclic diolefin (D) produced the most deposits within the holes of the fuel injectors, in comparison to other fuels tested, and thus the highest percent of flow restriction. With the holes plugged, the engine calibration requests more fuel in order to balance the fuel trim to keep the engine running Example 1 below describes these testing conditions, the results of which are set forth in Table 2 and also shown in FIGS. 1 and 2.

EXAMPLE 1

To study the effects of fuel chemistry on injector plugging, an automotive engine was set-up on an eddy-brake dynamometer (dyno) test stand and outfitted with pressure transducers, thermocouples, data acquisition, and exhaust system sensors commonly utilized in the automotive development test laboratories. The engine is generally described as a 2.0 liter (L) displacement production engine that is turbocharged and spark ignited direct injected. To evaluate the various fuel compositions, which are set forth in Table 2, a repeatable engine duty cycle with moderate speed and load set points relative to Wide Open Throttle (WOT) operation was utilized during a continuously operating test cycle, in other words, it did not include an "engine shutdown hot soak cycle." Specifically, "Commercial Fuel A" and "Commercial Fuel B" refer to known regular, unleaded gasoline with an octane level of 87. "HSF" refers to the afore-described high sulfur base fuel composition. "Tier 2" refers to a known certification gasoline from the Environmental Protection Agency (EPA) (i.e., no additives). "Low T90" refers to a gasoline having a T90 of 130° C. to 145° C. (relative to an average of 160° C. to 165° C. for regular unleaded gasoline (e.g., octane 87) in the marketplace). "HSFPD" refers to an embodiment of the herein described deposit-forming reference fuel composition comprising the described high sulfur base fuel composition (HSF) and the described peroxide (P) and diolefin (D) in a 5:1 ratio of D to P.

TABLE 2

| Fuel | Percent (%) Plugged | Persistent? |
| --- | --- | --- |
| Commercial Fuel A | 3.6 | Yes |
| Commercial Fuel B | 4.4 | Yes |
| HSF | 11.9 | No |
| Tier 2 + Sulfur | 12.2 | No |
| "Low T90" Fuel | 7.5 | Yes |
| HSFPD (5:1 D to P ratio) | 24.5 | Yes |

Figure 1:
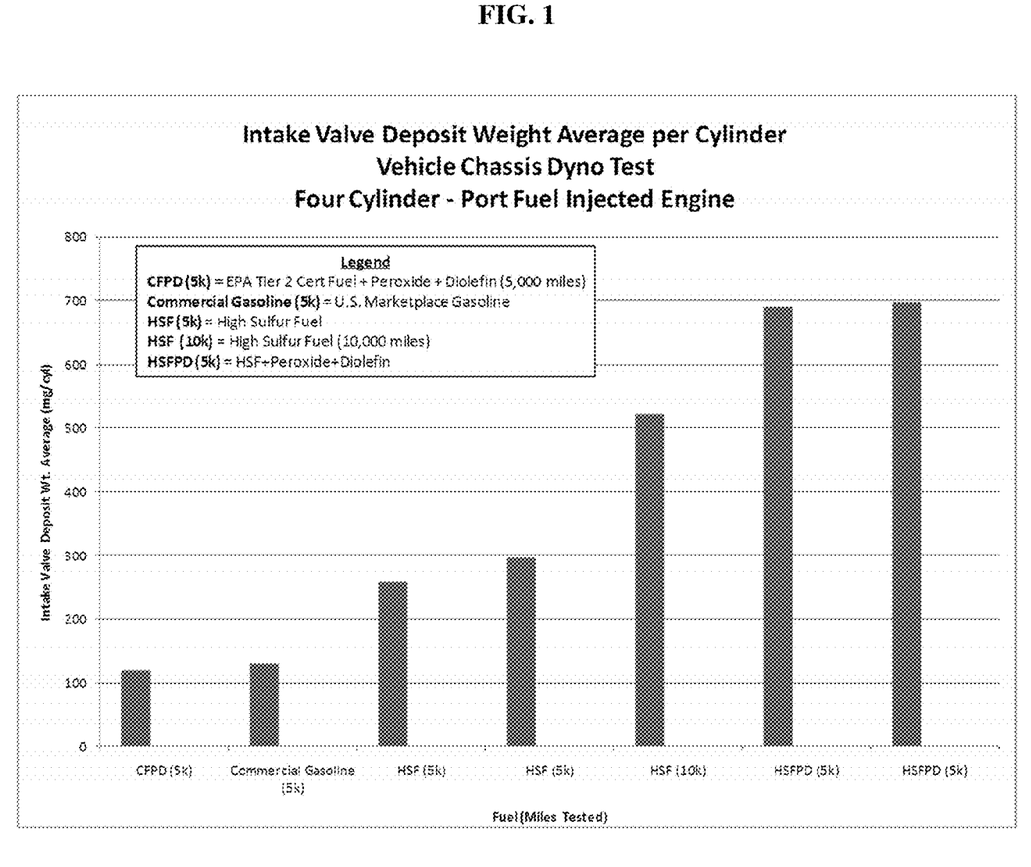
FIG. 1 is a graph depicting comparative results of engine dyno testing of various fuel compositions regarding level of intake valve deposits (IVD)
Figure 2:
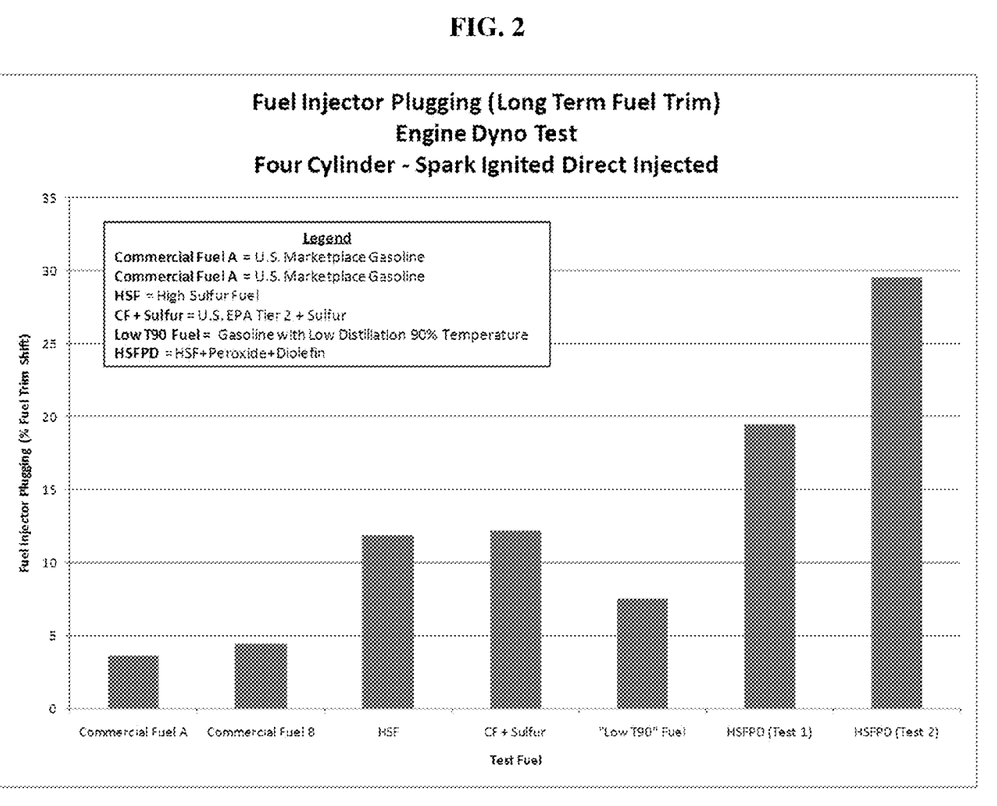
FIG. 2 is a graph depicting comparative results of engine dyno testing of various fuel compositions regarding percentage of injector flow restriction.

As shown in FIG. 1, the HSFPD fuel compositions according to embodiments resulted in the most intake valve deposits. The least deposits shown on FIG. 1 resulted from both the comparative "CFPD" composition, which refers to an Environmental Protection Agency (EPA) certified Tier 2 gasoline with peroxide (P) and diolefin (D) additions and comparative "Commercial" composition, which refers to a regular unleaded gasoline (octane level of 87).

Figure 3A:
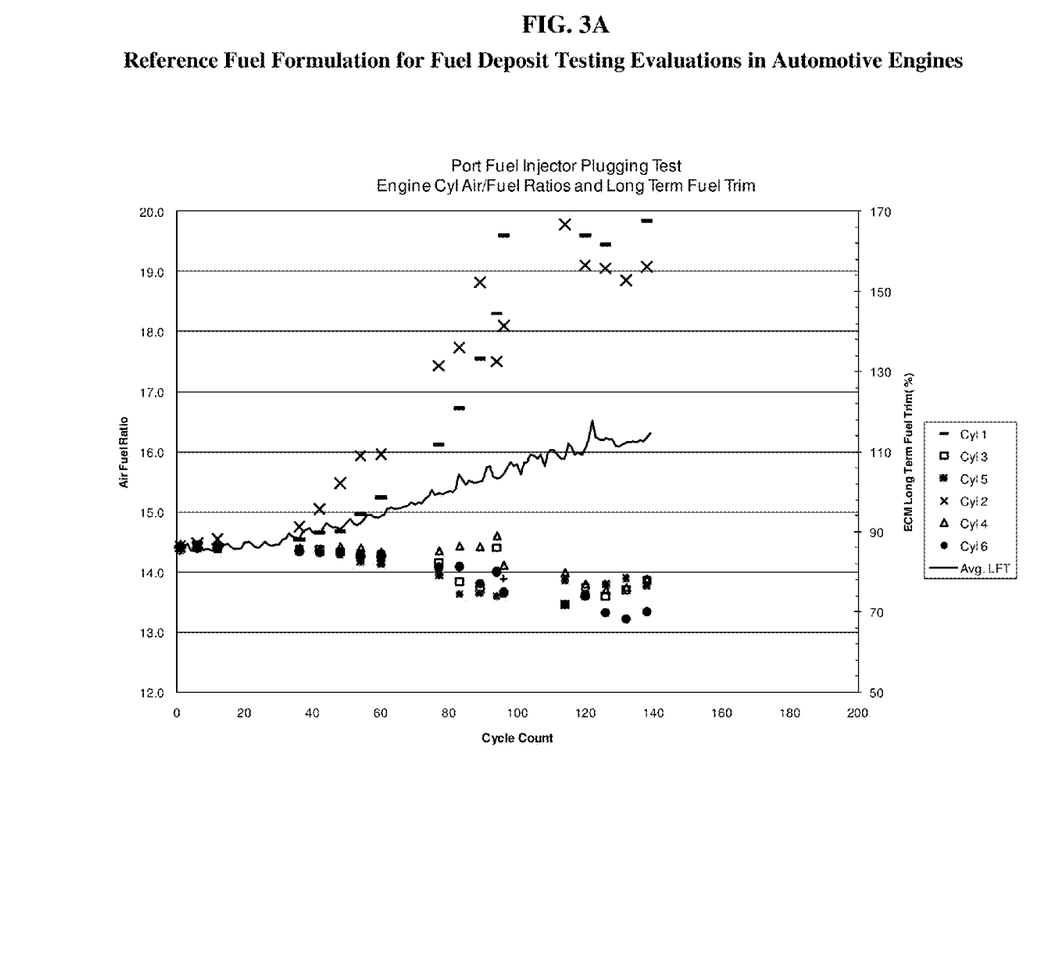
FIG. 3A is a graph depicting air/fuel ratio versus cycle count and FIG. 3B depicts engine test number and percent plugging.
Figure 3B:
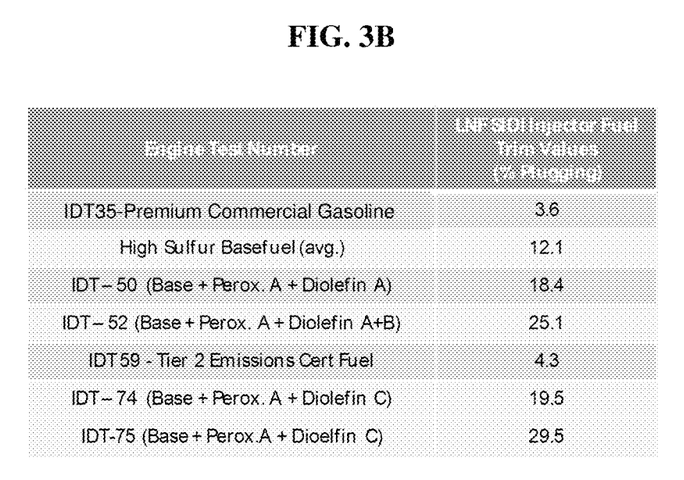

Example 2 below describes additional testing to measure air/fuel ratio according to an embodiment, and FIG. 3A graphically depicts the results of this testing. FIG. 3B depicts engine test number and percent plugging.

EXAMPLE 2

To further study the effects of fuel chemistry effects on injector plugging, an automotive engine was set-up on an eddy-brake dynamometer (dyno) test stand and outfitted with pressure transducers, thermocouples, data acquisition, and exhaust system sensors commonly utilized in the automotive development test laboratories. The engine is generally described as a 3.4 L displacement production engine that is naturally aspirated and port fuel injected (PFI). To evaluate the various fuel compositions, a repeatable engine duty cycle with moderate speed and load set points relative to Wide Open Throttle (WOT) operation was utilized during an operating test cycle that included an "engine shutdown hot soak cycle."

EXAMPLE 3

Further intake valve deposit testing was conducted on a deposit forming reference fuel composition described herein and the results are set forth in Table 3 below. The composition comprised 10 weight percent ethanol based on the total fuel composition, and commercial fuel (SG) available from a U.S. petroleum company was used as the base fuel composition, as noted in Table 3. The testing was conducted as follows. To study the effects of fuel chemistry effects on intake valve deposit development, an automotive engine was set-up on an eddy-brake dynamometer (dyno) test stand and outfitted with pressure transducers, thermocouples, data acquisition, and exhaust system sensors commonly utilized in the automotive development test laboratories. The engine is generally described as a 3.4 L displacement production engine that is naturally aspirated and port fuel injected (PFI). To evaluate the various fuel compositions, a repeatable engine duty cycle with moderate speed and load set points relative to Wide Open Throttle (WOT) operation was utilized during an operating test cycle that included an "engine shutdown hot soak cycle."

As can be seen from Table 3, the intake valve deposits were even greater than those of the comparative tested fuel without ethanol.

TABLE 3

Intake valve deposit results (milligrams average over 4 cylinders)

| Olefin Chemistry | wt. % | Etha-nol % | Peroxide % | Base fuel | Sulfur | IVD |
|---|---|---|---|---|---|---|
| Dicyclopentadiene | ≥1.0 | 0 | ≥0.2 | SG | ≥400 ppm | 306 |
| Dicyclopentadiene | ≥1.0 | >10 | ≥0.2 | SG | ≥400 ppm | 1104 |

It is noted that "SG" herein refers to a commercially available unleaded gasoline having an octane level of 89. The gasoline does not include ethanol and is known in the industry as a $65^{th}$ percentile fuel. A $65^{th}$ percentile fuel is known as, e.g., a fuel composition wherein greater than 65% of the fuel compositions used in the United States have similar fuel composition properties.

In view of foregoing described embodiments, a reference fuel composition has been developed that can consistently produce a repeatable amount of carbon deposits in engine dyno and vehicle tests such that new gasoline detergent additives and new engine hardware can be evaluated for their ability to, for instance, keep internal combustion engines free of carbon deposits.

In an embodiment, a deposit-forming reference fuel composition comprises a high sulfur base fuel composition in an amount greater than 50 weight % based on total weight % of the deposit-forming reference fuel composition, wherein the high sulfur base fuel comprises greater than or equal to 200 ppm sulfur based on total sulfur content of the base fuel composition. The deposit-forming reference fuel also comprises a reactive diolefin dopant, and a reaction initiating peroxide. The reaction initiating peroxide has an active oxygen content greater than or equal to 2 weight % based on total oxygen content of the reaction initiating peroxide and a half-life temperature of 80° C. to 200° C. The deposit-forming reference fuel composition is free from a detergent additive and has a concentration ratio of greater than 1:1 for the reactive diolefin dopant to the reaction initiating peroxide.

In another embodiment, a method of making a deposit-forming reference fuel composition comprises preparing a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition. The method further comprises adding to the base fuel composition: a) a reactive diolefin dopant and b) a reaction initiating peroxide having an active oxygen content greater than or equal to 2 weight % based on total oxygen content of the reaction initiating, and having a half-life temperature of 80° C. to 200° C. The reactive diolefin dopant and the reaction initiating peroxide are added in a concentration ratio of greater than 1:1.

In a further embodiment, a fuel composition comprises a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition. The deposit-forming reference fuel also comprises a reactive diolefin dopant comprising a cyclic diolefin; and a reaction initiating alkyl peroxide with an active oxygen content greater than or equal to 2 weight % based on total oxygen content of the reaction initiating peroxide and a half-life temperature of greater than or equal to 90° C. The fuel composition has a concentration ratio of greater than 1:1 for the reactive diolefin dopant to the reaction initiating peroxide.

In the various embodiments, i) the base fuel composition can comprise greater than or equal to 340 ppm sulfur, greater than or equal to 30 volume % aromatics, greater than or equal to 10 volume % olefins, and a 90% Distillation Temperature of greater than or equal to 170° C.; and/or ii) the base fuel composition can comprise greater than or equal to 400 ppm sulfur; and/or iii) the composition can comprise a concentration ratio of greater than or equal to 5:1 for the reactive diolefin dopant to the reaction initiating peroxide; and/or iv) the composition can comprise greater than or equal to 10 volume % olefins; and/or v) the reaction initiating peroxide can be selected from the group consisting of di-t-butyl peroxide, dicumyl peroxide, 2,5-di(t-butylperoxyl)-3,3,5-trimethylcyclohexane, t-butyl peroxy-2-ethylhexanoate, 1,1-di(t-butylperoxy)-3,3,5-trimethylcyclohexane, 2,5-di(2-ethylhexanoylperoxy)-2,5-dimethylhexane, t-butyl peroxy-2-ethyhexanoate and a combination thereof; and/or the composition can comprise greater than or equal to 0.2 weight percent reaction initiating peroxide based on total weight percent of the reference fuel composition; and/or vi) the reactive diolefin dopant can be selected from the group consisting of indene, isoprene, dicyclopentadiene, anthracene, and a combination thereof; and/or the reaction initiating peroxide can comprise a half-life temperature of greater than or equal to 95° C.; and/or vii) the base fuel composition can be unleaded; and/or viii) the high sulfur base fuel composition can comprise greater than or equal to 400 ppm sulfur; and/or ix) the method can comprise blending greater than or equal to 10 volume % olefins in preparing the base fuel composition; and/or x) the method can comprise adding to the base fuel composition greater than or equal to 0.2 weight percent of the reaction initiating peroxide based on total weight percent of the reference fuel composition; and/or xi) the composition can comprise a concentration ratio of greater than or equal to 2:1 for the reactive diolefin to the reaction initiating alkyl peroxide; and/or xii) the base fuel composition can comprise ethanol.

All ranges disclosed herein are inclusive of the endpoints, and the endpoints are independently combinable with each other. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., aromatic(s) includes one or more aromatics). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A deposit-forming reference fuel composition comprising:
    a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition;
    a reactive diolefin dopant; and
    a reaction initiating peroxide having an active oxygen content greater than or equal to 2 weight % based on total oxygen content of the reaction initiating peroxide and a half-life temperature of 80° C. to 200° C.;
    the deposit-forming reference fuel composition being free from a detergent additive and having a concentration ratio of greater than 1:1 for the reactive diolefin dopant to the reaction initiating peroxide.

2. The deposit-forming reference fuel composition of claim 1, wherein the base fuel comprises greater than or equal to 340 ppm sulfur, greater than or equal to 30 volume % aromatics, greater than or equal to 10 volume % olefins, and a 90% Distillation Temperature of greater than or equal to 170° C.

3. The deposit-forming reference fuel composition of claim 2, wherein the base fuel composition comprises greater than or equal to 400 ppm sulfur.

4. The deposit-forming reference fuel composition of claim 2, comprising a concentration ratio of greater than or equal to 5:1 for the reactive diolefin dopant to the reaction initiating peroxide.

5. The deposit-forming reference fuel composition of claim 2, comprising greater than or equal to 10 volume % olefins.

6. The deposit-forming reference fuel composition of claim 1, wherein the reaction initiating peroxide is selected from the group consisting of di-t-butyl peroxide, dicumyl peroxide, 2,5-di(t-butylperoxyl)-3,3,5-trimethylcyclohexane, t-butyl peroxy-2-ethylhexanoate, 1,1-di(t-butylperoxy)-3,3,5-trimethylcyclohexane, 2,5-di(2-ethylhexanoylperoxy)-2,5-dimethylhexane, t-butyl peroxy-2-ethyhexanoate, and a combination thereof.

7. The deposit-forming reference fuel composition of claim 6, comprising greater than or equal to 0.2 weight percent reaction initiating peroxide based on total weight percent of the deposit-reference fuel composition.

8. The deposit-forming reference fuel composition of claim 6, wherein the reactive diolefin dopant is selected from the group consisting of indene, isoprene, dicyclopentadiene, anthracene, and a combination thereof.

9. The deposit-forming reference fuel composition of claim 6, wherein the reaction initiating peroxide comprises a half-life temperature of greater than or equal to 95° C.

10. The deposit-forming reference fuel composition of claim 1, wherein the base fuel composition is unleaded.

11. A method of making a deposit-forming reference fuel composition comprising:
    preparing a high sulfur base fuel composition in an amount greater than 50 weight % based on total weight % of the deposit-forming reference fuel composition, wherein the high sulfur base fuel composition comprises greater than or equal to 200 ppm sulfur based on total sulfur content of the base fuel composition; and
    adding to the base fuel composition: a) a reactive diolefin dopant and b) a reaction initiating peroxide having an active oxygen content greater than or equal to 2 weight % based on total oxygen content of the reaction initiating, and having a half-life temperature between 80° C. and 200° C.; wherein the reactive diolefin dopant and the reaction initiating peroxide are added in a concentration ratio of greater than 1:1.

12. The method of claim 11, wherein the high sulfur base fuel composition comprises greater than or equal to 400 ppm sulfur.

13. The method of claim 11, wherein the concentration ratio for the reactive diolefin dopant to the reaction initiating peroxide is greater than or equal to 5:1.

14. The method of claim 11, further comprising blending greater than or equal to 10 volume % olefins in preparing the base fuel.

15. The method of claim 11, wherein the reaction initiating peroxide is selected from the group consisting of di-t-butyl peroxide, dicumyl peroxide, 2,5-di(t-butylperoxyl)-3,3,5-trimethylcyclohexane, t-butyl peroxy-2-ethylhexanoate, 1,1-di(t-butylperoxy)-3,3,5-trimethylcyclohexane, 2,5-di(2-ethylhexanoylperoxy)-2,5-dimethylhexane, t-butyl peroxy-2-ethyhexanoate, t-butyl peroxy-2-ethylhexanoate and a combination thereof.

16. The method of claim 15, comprising adding to the base fuel composition greater than or equal to 0.2 weight percent of the reaction initiating peroxide based on total weight percent of the reference fuel composition.

17. The method of claim 15, wherein the reactive diolefin dopant is selected from the group consisting of indene, isoprene, dicyclopentadiene, anthracene, and a combination thereof.

18. The method of claim 17, wherein the reaction initiating peroxide comprises a half-life temperature of greater than or equal to 95° C.

19. A fuel composition comprising:
   a high sulfur base fuel composition in an amount greater than or equal to 200 ppm sulfur based upon total sulfur content of the base fuel composition;
   a reactive diolefin dopant comprising a cyclic diolefin; and
   a reaction initiating alkyl peroxide with an active oxygen content greater than or equal to 2 weight % based on total oxygen content of the reaction initiating peroxide and a half-life temperature of greater than or equal to 90° C.;
   the fuel composition having a concentration ratio of greater than 1:1 for the reactive diolefin dopant to the reaction initiating peroxide.

20. The fuel composition of claim 19, comprising a concentration ratio of greater than or equal to 2:1 for the reactive diolefin to the reaction initiating alkyl peroxide.

21. The fuel composition of claim 20, comprising a concentration ratio of greater than or equal to 5:1 for the reactive diolefin to the reaction initiating peroxide.

22. The fuel composition of claim 19, wherein the base fuel composition comprises ethanol.

* * * * *